C. E. SARGENT.
DUST SEPARATOR.
APPLICATION FILED JULY 13, 1918.
1,302,716.
Patented May 6, 1919.
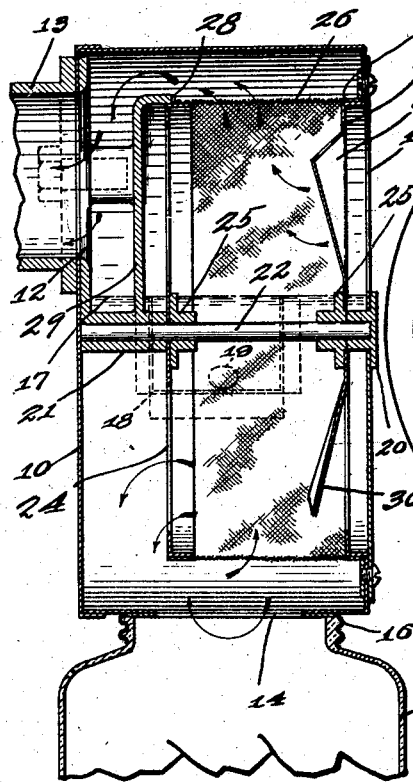
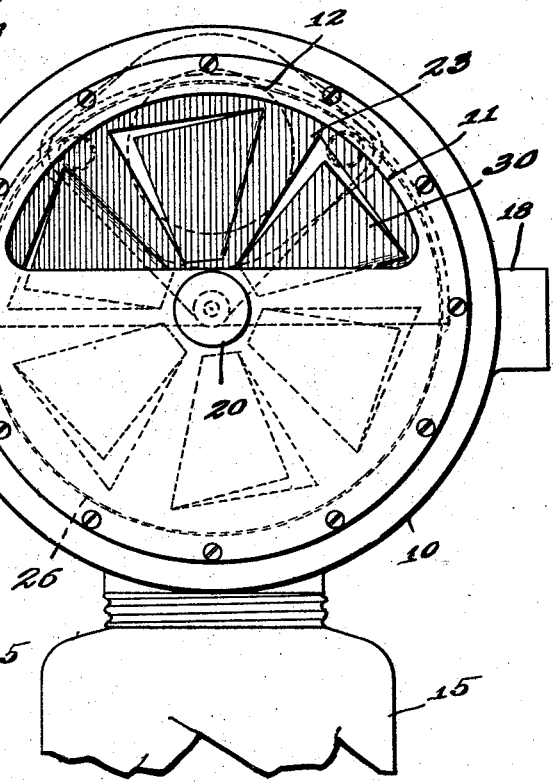
Witness
Frank A. Fahle
Inventor
Charles E. Sargent,
By Hood & Schley.
Attorneys

UNITED STATES PATENT OFFICE.

CHARLES E. SARGENT, OF INDIANAPOLIS, INDIANA, ASSIGNOR TO MIDWEST ENGINE COMPANY, OF INDIANAPOLIS, INDIANA, A CORPORATION OF INDIANA.

DUST-SEPARATOR.

1,302,716.        Specification of Letters Patent.        Patented May 6, 1919.

Application filed July 13, 1918. Serial No. 244,724.

*To all whom it may concern:*

Be it known that I, CHARLES E. SARGENT, a citizen of the United States, residing at Indianapolis, in the county of Marion and State of Indiana, have invented a new and useful Dust-Separator, of which the following is a specification.

It is the object of my invention to provide an air washer, for cleaning the air which is supplied to internal combustion engines; and to do so in a device which is at once efficient, simple, and inexpensive.

The accumulation of carbon in automobile and tractor engines results mainly from an accumulation of dust and oil, and would be many months longer in forming if the dust could be removed from the air before the air is drawn into the engine. Devices have already been proposed for separating the dust from the air. In general, these have worked either on the centrifugal separator principle, which gives low efficiency because the high velocity of the air keeps the finer particles of dust so stirred up that they are not removed; or on the principle of bubbling the air through water, which has the disadvantage of decreasing the volumetric efficiency of the engine because it necessarily reduces the head or absolute pressure of the air. These former types are therefore open to serious objection.

According to my present invention, I avoid these difficulties. In order to separate dust from air by water, the globules of air must be very fine in order that the suspended dust will touch and be caught by the water. Otherwise the dust will go through the water, suspended within the air globules. By my present invention, the air is broken up very finely, so that practically all of it comes in contact with water; and the water through which the air passes, instead of being in a mass through which the air bubbles, is carried by a screen which is partly submerged and partly exposed to the passing air, so that the air passes through the wetted screen, and the action of the passing air is made to produce a movement of the screen so that newly wetted parts are continually exposed to the passing air and the parts which have been acting to permit the air to pass are in turn returned to the water so as to be washed thereby. This also moistens the air which passes to the engine, producing the well-known advantages from such moistening.

The accompanying drawing illustrates my invention. Figure 1 is a vertical axial section through the air washer embodying my invention; and Fig. 2 is a front elevation of such air washer.

The casing 10, conveniently cylindrical in form, is provided in front with a segmental air inlet opening 11 which extends over the greater part of the upper half of such front, and in the rear is provided with an air outlet opening 12 communicating with a pipe 13 which is the air intake pipe of the associated internal combustion engine, usually by way of a carbureter. In the bottom of the casing there is an opening 14 which communicates with any suitable vessel, such as a Mason jar 15, which is removably attached to the casing as by a threaded flange 16 at the bottom of the latter. Save for the openings 11 and 12, the unit composed of the casing 10 and the Mason jar 15 is substantially air and water tight; and is preferably filled with water to a level 17 somewhat higher than the middle of the casing 10. The filling with water may be done in any convenient way, as through a filling cup 18 at one side of the casing 10, which filling cup is connected to the interior of the casing by an opening 19 below the water level 17. The bottom edges of the openings 11 and 12 are of course higher than the water level 17.

The front and back of the casing 10 are provided with siutable supporting bearings 20 and 21 for a drum shaft 22, extending axially of the casing 10. The drum consists of a front plate 23 and a back plate 24 suitably mounted on the shaft 22, as by collars 25, which plates are in general disk-shaped and are provided with peripheral flanges to which is fastened a cylinder 26 of suitable wire screen. The peripheral flanges of the front drum plate 23 fit fairly closely within suitable annular guides 27 formed on the inside of the front of the casing 10, so as to prevent material flow of air between them; and that part of the peripheral flange of the rear plate 24 which is above the water level 17 at any time correspondingly fits within the semi-circular flange 28 at the edge of a baffle plate 29 extending upward from the bearing 21 so as to prevent improper flow of the air. The back plate 24 of the drum is provided with openings through it, for permitting flow of water, though flow of air is prevented through such openings by reason of the baffle plate 29. The front plate 23 is also provided with openings, which are formed by punching out vanes 30 from the plate by cutting such vanes away on three sides and bending them along the remaining side so that they are back of and at an angle to the plane of the front plate.

In operation, the associated engine develops a suction in the pipe 13, so that air is drawn in through the opening 11 in the front of the casing, and through the vane openings in the front plate 23 of the drum, to the interior of the drum above the water level 17; and thence out through the periphery of the drum by passing through the interstices of the screen 26 to the upper part of the space within the casing 10, and thence to the pipe 13 and on to the carbureter and engine. The air which enters the drum strikes the vanes 30 with considerable force, and consequently produces rotation of the drum on its axis formed by the shaft 22. The rotation of the drum causes the screen 26 to carry up water from the main mass of water, so that the air which passes through such screen comes in close contact with the water on the screen; for the screen compels a very fine division of the air so that practically all of it may come into contact with the water carried by the screen. By reason of the rotation of the drum, a newly wetted screen surface is continuously exposed to the passing air; and the screen surface after being exposed, and in consequence to some extent dirtied and dried, passes down below the water level 17 so that it is washed by the water and re-wetted. The washing of the screen is assisted by the water movement which is produced by the vanes 30 as they pass through the water. As the drum rotates, these vanes move the water axially through the drum and out through the openings in the back plate 24, thus causing water to be drawn radially inward through the screen 26 into the drum. This produces an effective washing, for the water movement into the drum through the screen 26 is in the reverse direction from the outward movement of the air which is passing through the pipe 13. The dirt which is washed out of the air and deposited on the screen, and is then washed from the screen by the mass of moving water, settles into the bottom of the Mason jar 15, which may be removed and emptied as occasion requires so as to keep the water reasonably clean. The movement of water is mainly within the casing 10 and the upper part of the Mason jar 15, so that the sediment which has settled in the bottom of such jar is not stirred up. The speed of rotation of the drum depends upon the velocity with which the air is drawn in by the engine, speeding up as the air velocity increases and slowing down as it decreases; so that the rate of change of the screen surface which is exposed to the air and the rate at which the newly wetted screen surface is brought into position to wash the air varies with the amount of air to be washed. Thus the air which is drawn into the engine is efficiently washed, without any material loss of head.

I claim as my invention:

1. An air washer, comprising a liquid container, a hollow screen drum mounted for movement within said container so that as it moves the parts of its screen successively dip into and come out of such liquid, means for directing a current of air inward at one end of the drum and outward through that part of the screen which is out of the liquid, and vanes associated with said screen so as to produce movement thereof by such current of air.

2. An air washer, comprising a liquid container, a hollow screen drum mounted for movement within said container so that as it moves the parts of its screen successively dip into and come out of such liquid, and means for directing a current of air inward at one end of the drum and outward through that part of the screen which is out of the liquid.

3. An air washer, comprising a liquid container, a screen mounted for movement within said container so that as it moves its parts successively dip into and come out of such liquid, means for directing a current of air through that part of the screen which is out of the liquid, and vanes associated with said screen for producing a current in such liquid in the reverse direction through the submerged face of said screen from that through which said air passes when such parts are not submerged.

4. An air washer, comprising a liquid container, a screen mounted for movement within said container so that as it moves its parts successively dip into and come out of such liquid, means for directing a current of air through that part of the screen which is out of the liquid, and vanes associated with said screen so as to produce movement thereof by such current of air and to produce a current of said liquid through said screen in the reverse direction from that in which the air passes therethrough.

5. An air washer, comprising a container arranged to be partly filled with liquid and having air inlet and air outlet openings above the liquid level, a drum rotatably mounted within said container so that its parts pass alternately below and above the liquid level, said drum comprising two end plates connected by a screen, and vanes in one of said end plates for producing rotation of the drum as air passes through it between said inlet and outlet openings, the other end plate of said drum being provided with openings for permitting the passage of liquid therethrough, and a stationary plate coöperating with the upper part of the drum for preventing the passage of air through the openings in said latter end plate, so that the vanes in the former end plate produce a current of liquid through the screen in the reverse direction from that in which the air passes therethrough.

6. An air washer, comprising a container arranged to be partly filled with liquid and having air inlet and air outlet openings above the liquid level, a drum rotatably mounted within said container so that its parts pass alternately below and above the liquid level, said drum comprising two end plates connected by a screen, one of said end plates being provided with openings connecting the interior of the drum to the atmosphere, and vanes associated with said openings for producing rotation of the drum as air passes through it between said inlet and outlet openings.

7. An air washer, comprising a container arranged to be partly filled with liquid and having air inlet and air outlet openings above the liquid level, and a drum rotatably mounted within said container so that its parts pass alternately below and above the liquid level, said drum comprising two end plates connected by a screen, one of said end plates being provided with openings connecting the interior of the drum to the atmosphere.

8. An air washer, comprising a container arranged to be partly filled with liquid and having air inlet and air outlet openings above the liquid level, a drum rotatably mounted within said container so that its parts pass alternately below and above the liquid level, said drum comprising two end plates connected by a screen, one of said end plates being provided with openings connecting the interior of the drum to the atmosphere, and means for producing rotation of said drum.

In witness whereof, I have hereunto set my hand at Indianapolis, Indiana, this 11th day of July, A. D. one thousand nine hundred and eighteen.

CHARLES E. SARGENT.

Copies of this patent may be obtained for five cents each, by addressing the "Commissioner of Patents, Washington, D. C."